United States Patent
Sloan

[19]

[11] Patent Number: 5,890,864
[45] Date of Patent: Apr. 6, 1999

[54] HEAVY-DUTY HAY SCISSORS LIFT

[76] Inventor: Willie Davis Sloan, 309 Sloan Rd., Louisville, Miss. 39339

[21] Appl. No.: 965,116

[22] Filed: Nov. 6, 1997

[51] Int. Cl.$^6$ .................................................. A01D 87/12
[52] U.S. Cl. ..................... 414/24.5; 414/703; 414/715; 414/920
[58] Field of Search ............................... 414/24.5, 24.6, 414/715, 718, 703, 920

[56] References Cited

U.S. PATENT DOCUMENTS

| | | |
|---|---|---|
| 3,983,960 | 10/1976 | Sikli . |
| 4,113,065 | 9/1978 | Sikli . |
| 4,221,280 | 9/1980 | Richards . |
| 4,264,252 | 4/1981 | Jennings et al. . |
| 4,343,379 | 8/1982 | Haulotte . |
| 4,674,786 | 6/1987 | Lynch . |
| 4,778,330 | 10/1988 | Mailleux et al. . |
| 4,854,809 | 8/1989 | Rhodes . |
| 4,911,596 | 3/1990 | Fetter . |
| 5,129,775 | 7/1992 | Coats et al. ........................ 414/920 X |
| 5,150,999 | 9/1992 | Dugan . |
| 5,178,505 | 1/1993 | Smith . |
| 5,281,068 | 1/1994 | Bruce . |

FOREIGN PATENT DOCUMENTS 2673422   9/1992   France ................................... 414/920

Primary Examiner—Janice L. Krizek

[57] ABSTRACT

A load lifting scissors lift assembly, as an attachment for the three-point-hitch of a farm tractor, which utilizes a scissors-action, hinged, expandable linkage. The Heavy-duty Hay Scissors Lift assembly contains one pair of crossed lever arms, each connecting to a vertical load engaging structure (in the case described, a hay spike arrangement), the first through intermediate connection to a variable length middle arm, or third arm, and the second through direct connection to the lowest point of the load engaging structure. The assembly is constructed to multiply the lift of the tractor's lift arms. The expanding linkage is capable of lifting standard six-foot high round bales of hay or other material, outwards and upwards and placing one bale on top of another. The Heavy-duty Hay Scissors Lift is constructed without the use of additional hydraulics, to minimize the cost of materials, complexity, maintenance, and redundancy (a tractor having lift arms already has hydraulics). An alternate embodiment of the invention is constructed with the replacement of the intermediate member with a hydraulic cylinder which adds the ability to release the load while elevated for deposit over a fence, rail, or hay guard structure.

6 Claims, 7 Drawing Sheets

HEAVY-DUTY HAY SCISSORS LIFT

BACKGROUND

The present invention relates to a device for lifting and/or moving bales of hay, preferably round bales of hay. More particularly, this invention relates to a device which can be attached to an existing vehicle to convert the latter into a bale lifter and/or mover.

Present farming operations are increasingly utilizing round hay bales rather than the familiar rectangular or "square" bales. Most farmers have difficulty moving and storing these bales because of their size, weight, and awkwardness. Farmers would like to move these round bales quickly and compactly; however, there is limited field equipment available for this purpose, and that which is available is far too costly for the smaller farmers, in addition to being large, cumbersome, and complex.

Farmers currently baling round hay bales are utilizing several multi-use attachments, forklifts, front-end loaders, and other machines to lift and move the round bales of hay for storage and feeding.

Hay forks, which operate on the lift arms of the tractor, will move one bale from place to place in the field, but in order to quickly load a trailer using hay forks, the trailer must be parked in a ditch, and loaded from the side. If there is a ditch available, it can be moist and easily trap the trailer in mud. Another drawback to the hay forks is that there is no way to stack the bales two-high in the hay barn, requiring double the surface area under roof to store round bales out of the weather.

The hay spike operates much the same way as the hay forks and has the same disadvantages.

Some farmers have tractors equipped with front-end loaders, while other farmers own a separate piece of equipment for the front-end-loader. This front-end-loader will accomplish the desired end result, however, the lower income farmer usually cannot afford a tractor large enough to power the hydraulics required for the front-end loader, nor could they afford the cost of a separate machine for this purpose. Also, when using the front-end loader type of attachment, the larger the hay bale, the larger the tractor needed for counterbalance, thus adding to the economical disadvantages of this option.

Some farmers use an attachment called a hay forklift, similar to a fork-lift type machine. This equipment is more costly, includes a mast and carriage, and requires hydraulics, which as already stated, are only available on the larger, more costly tractors.

With property values and expense of buildings on the rise, farmers also want a way to stack rolled bales, and reduce their storage area. The Heavy-duty Hay Scissors Lift will accomplish this.

For the foregoing reasons, there is a need for a Hay Lift device that is compact, quick and easy to install, simple to operate, and inexpensive to build.

A preliminary search was conducted on the field of the above invention and the following U.S. Patents were uncovered in the search:

| Inventor | U.S. Pat. No. | Issue Date |
| --- | --- | --- |
| Dugan | 5,150,999 | Sept. 29, 1992 |
| Smith | 5,178,505 | Jan. 12, 1993 |
| Rhodes | 4,854,809 | Aug. 8, 1989 |
| Bruce | 5,281,068 | Jan. 25, 1994 |
| Fetter | 4,911,596 | March 27, 1990 |
| Lynch | 4,674,786 | June 23, 1987 |
| Mailleux et al. | 4,778,330 | Oct. 18, 1988 |

The Dugan patent discloses an attachment for use on the front of a tractor, or adapted for use on the rear, which operates as a swing arm, or hinged lever and utilizes additional hydraulics. An alternate embodiment of the Dugan attachment calls for a rear mounted rotating frame, which is large, complex in comparison to the Heavy-duty Hay Scissors Lift, and therefore heavy. The Heavy-duty Hay Scissors Lift operates with expanding scissors-action, with less material, expense, time, and effort.

The Smith patent discloses an attachment with 2 frames and 2 hydraulic cylinders, with multiple impaling spears. This attachment uses intermediate channels and a connecting framework between the three-point-hitch and the bale lifting device, involving the addition of materials, time, and expense. An additional hydraulic cylinder provides for pivoting of the load once it is engaged and lifted. The lift height is stated as being approximately 42 inches. The Heavy-duty Hay Scissors Lift operates with scissors-action, is simple in design and installation, pivots the load simultaneously as it lifts, and will lift 63 inches.

The Rhodes patent shows a hay bale elevator apparatus in a hinged box-like configuration in combination with a hydraulic cylinder. Engaging of the bale is done with a pair of tubular forks which reach under the bale. Engaging the hydraulic cylinder lifts the outer framework which is guided in its movement by the rear framework. The Heavy-duty Hay Scissors Lift, requires minimal material, functions with scissors-action, engages the bale face with a spear, and will lift the bale 63 inches high.

The Bruce patent shows a vertical framework or mast, having pivoting overhead lift arms which are powered from above and grab the bale from overhead by closing around the circumference. This device requires external power to pivot the arms to engage and release the hay bale. The Heavy-duty Hay Scissors Lift is a small and simple attachment, operating from ground level and with little set up time, material, and effort.

The Fetter patent shows a pivoting frame for mounting on the front of a tractor, having round bale engaging forks, a back stop for the bale to rest upon when lifted, and a hydraulic cylinder. The Fetter device will lift a bale to be moved without addressing the need to stack bales one upon another. The Heavy-duty Hay Scissors Lift, operates with scissors-action and is specifically designed to lift a six-foot load high enough to set one load upon another.

The Lynch patent shows a bale handling device with impaling spears mounted on a frame. The strength of the large impaling spear was an object of the Lynch invention, which was addressed with an elongated sheath. The Heavy-duty Hay Scissors Lift does not require an elongated sheath on the load engaging means. The Heavy-duty Hay Scissors Lift addresses the additional function of raising the bale.

The Mailleux et al. device is an overhead swing attached to the tractor loader arms. It contains clamps mounted on a mast, and is much heavier, complex and more expensive to build, as well as more difficult to connect and disconnect to a tractor, requiring the tractor to have loader arms. The Heavy-duty Hay Scissors Lift can be moved by one person, is quickly connected and disconnected, and mounts on the three-point-hitch of a tractor.

A number of other methods have been tried to lift and load these bales, which are either more cumbersome, complex, or costly. None of the above patents or methods describe disclose the specific structural arrangement and relationship of the components incorporated into this invention, nor will they accomplish all of the objects of this invention.

The Heavy-duty Hay Scissors Lift can replace the above described types of equipment. The present invention, the Heavy-duty Hay Scissors Lift, provides a simple and inexpensive way to load and unload round bales, including the ability to stack large round bales with the same simple device.

FUNCTIONS AND ADVANTAGES

The present invention constitutes an add-on or attachment to a farm tractor having a three-point-hitch and satisfies the need for a bale lifter that is compact, quick and easy to install, simple to operate, and inexpensive to build. The Heavy-duty Hay Scissors Lift eliminates the need to purchase or rent a front-end loader, forklift, or other additional piece of equipment, can be produced at a relatively low cost, and operates strictly off the movement of the tractor's existing hydraulic lift arms.

The Heavy-duty Hay Scissors Lift will lift round hay bales high enough to load a trailer on level ground, and/or to stack two bales high thus cutting storage space, and saving maneuvering time. The Heavy-duty Hay Scissors Lift can be used to pick up freshly rolled hay, load it on a trailer for travel to the storage site, and to unload and stack it under a shelter. The lift is also useful for picking a bale out of storage, and carrying it to the field for feeding livestock. By selecting material for maximum strength, and sizing the parts for maximum lift, a compact and affordable attachment is built which will operate from the three-point-hitch of a conventional tractor. The action of this mechanism is to multiply the lift from the tractor's hydraulics to a lift of five feet and three inches, minimum.

The Heavy-duty Hay Scissors Lift has three main moveable elements and is constructed to minimize wear. No maintenance is necessary. By attaching the lift to the existing tractor, the cost of new equipment is kept at a minimum. By utilizing the already existing hydraulic lift of the tractor, the Heavy-duty Hay Scissors Lift can be operated without the addition of hydraulic cylinders, lines, and pressure regulating equipment. This eliminates much of the construction and maintenance costs, as well as the complexity and hazards associated with high pressure hydraulics. By constructing the invention as designed, the lift will reach high enough to stack two bales high on a drive-on trailer, reducing loading and unloading time.

The Heavy-duty Hay Scissors Lift will lift 1,000 pound to 2,000 pound bales, five feet wide and six feet high, five feet and three inches above ground. This device saves time, and therefore money, as well as is not physically strenuous to the farmer, and permits continued production into the advanced years.

The Heavy-duty Hay Scissors Lift can be used on any tractor with a three-point-hitch, large or small, utilizes no additional hydraulics, is simple to maintain, attaches quickly and easily, can be stored outdoors, and is built to withstand repeated use without maintenance. The Heavy-duty Hay Scissors Lift can be installed by a single operator and easily detaches for storage.

An alternate embodiment utilizes a hydraulic cylinder, which when actuated, will tilt the load forward, thus allowing the weight of the bale to drop from the load engaging means to the desired location. The advantage of this embodiment is to provide a means of depositing a bale into a conventional feeding ring, or hay ring, which includes a circular framework, usually constructed of tubular steel, containing enough cross pieces to keep livestock from walking onto the bale while allowing access for livestock to reach through and eat from the bale, without the added inconvenience of dismounting the tractor to relocate the hay ring around the newly deposited hay bale.

Advantages of the Heavy-duty Hay Scissors Lift are its small, compact size, ease of attachment and detachment, low or no maintenance, high strength, long life, single operator, simple structure, minimal wear surfaces, fast operation, and multiple use: load trailers, unload trailers, stack bales in barn, retrieve bales, transport to the pasture, supply to livestock, all with one simple mechanism.

DRAWINGS

Figure 4:
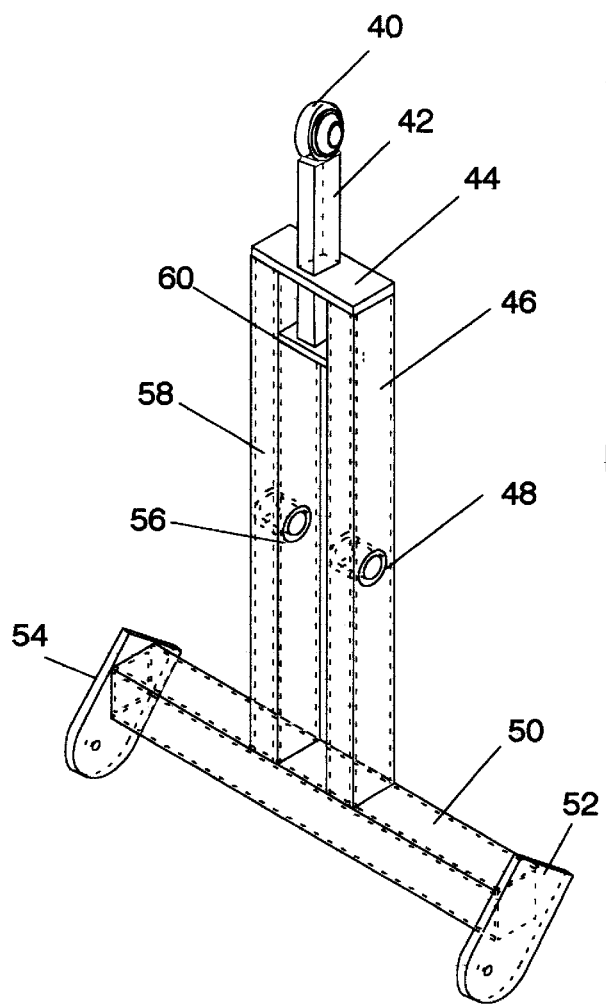
FIG. 4 illustrates Stage 2 of the Heavy-duty Hay Scissors Lift assembly.
Figure 7:
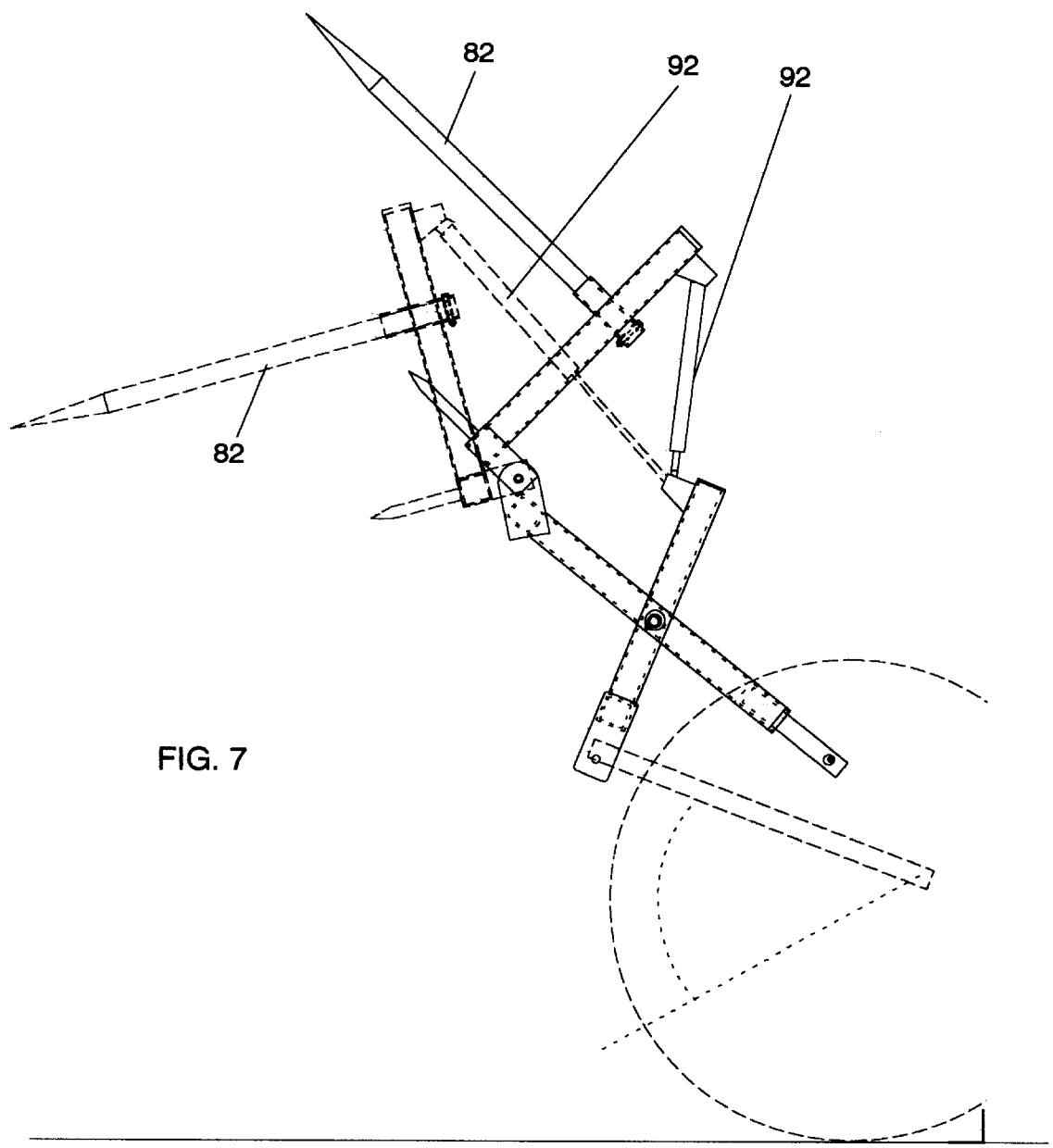

FIG. 7 illustrates the extended Heavy-duty Hay Scissors Lift. This view illustrates the multiplication of movement provided by the assembly, and the inter-related movements of the three stages of the Heavy-duty Hay Scissors Lift. Overlaying FIG. 5 over FIG. 4, illustrates the extent of movement available.

Figure 8:
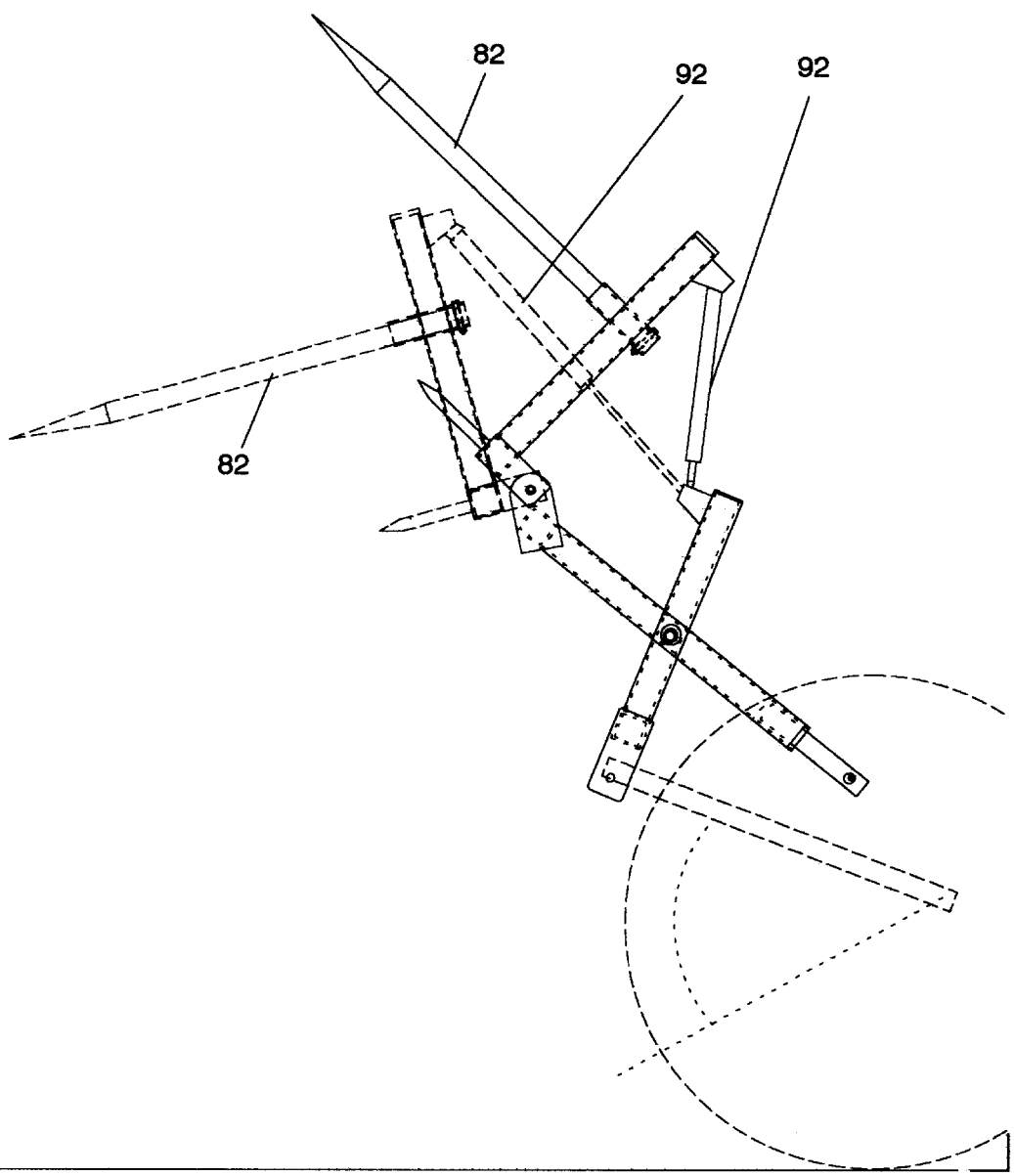

FIG. 8 is a sketch of the Heavy-duty Hay Scissors Lift with a Hydraulic Cylinder installed in place of the adjustable length Intermediate Member. The actuated position of the cylinder is shown in dashed lines.

GENERAL DESCRIPTION

The Heavy-duty Hay Scissors Lift is constructed of material strong enough to withstand the repeated stresses of lifting up to 2,000 pound bales of hay. A number of suitable materials are available and have been tried, including angle, plate, channel, and flat bar. The preferred construction uses square steel tubing for its compactness, strength, and durability, ½" and ¾" plate for maximum durability. Although a number of means could be employed to assemble and fasten these components, welding has been the preferred method.

Figure 1:
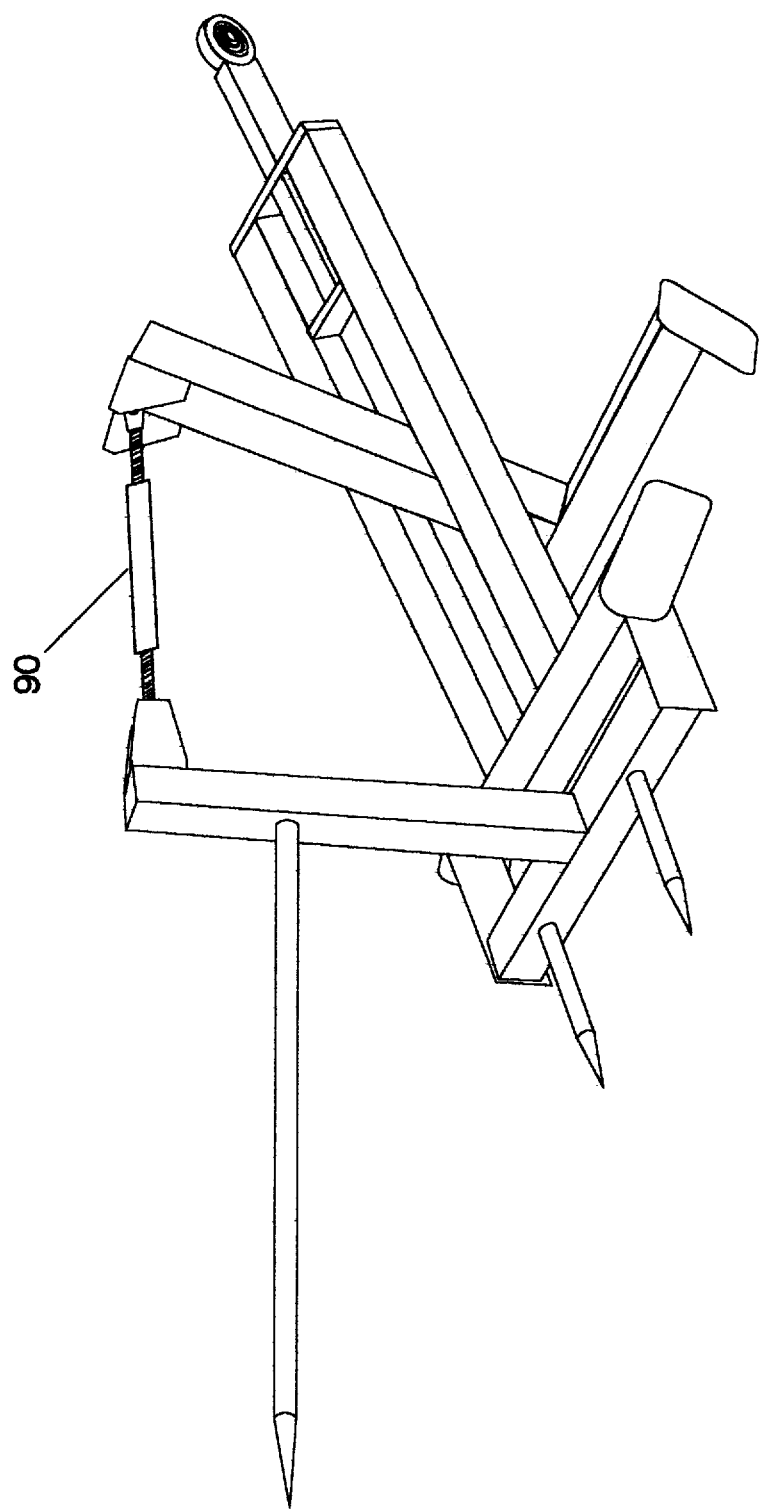
FIG. 1 is a 3-dimensional representation (sketch, likeness) of the assembled Heavy-duty Hay Scissors Lift.
Figure 2:
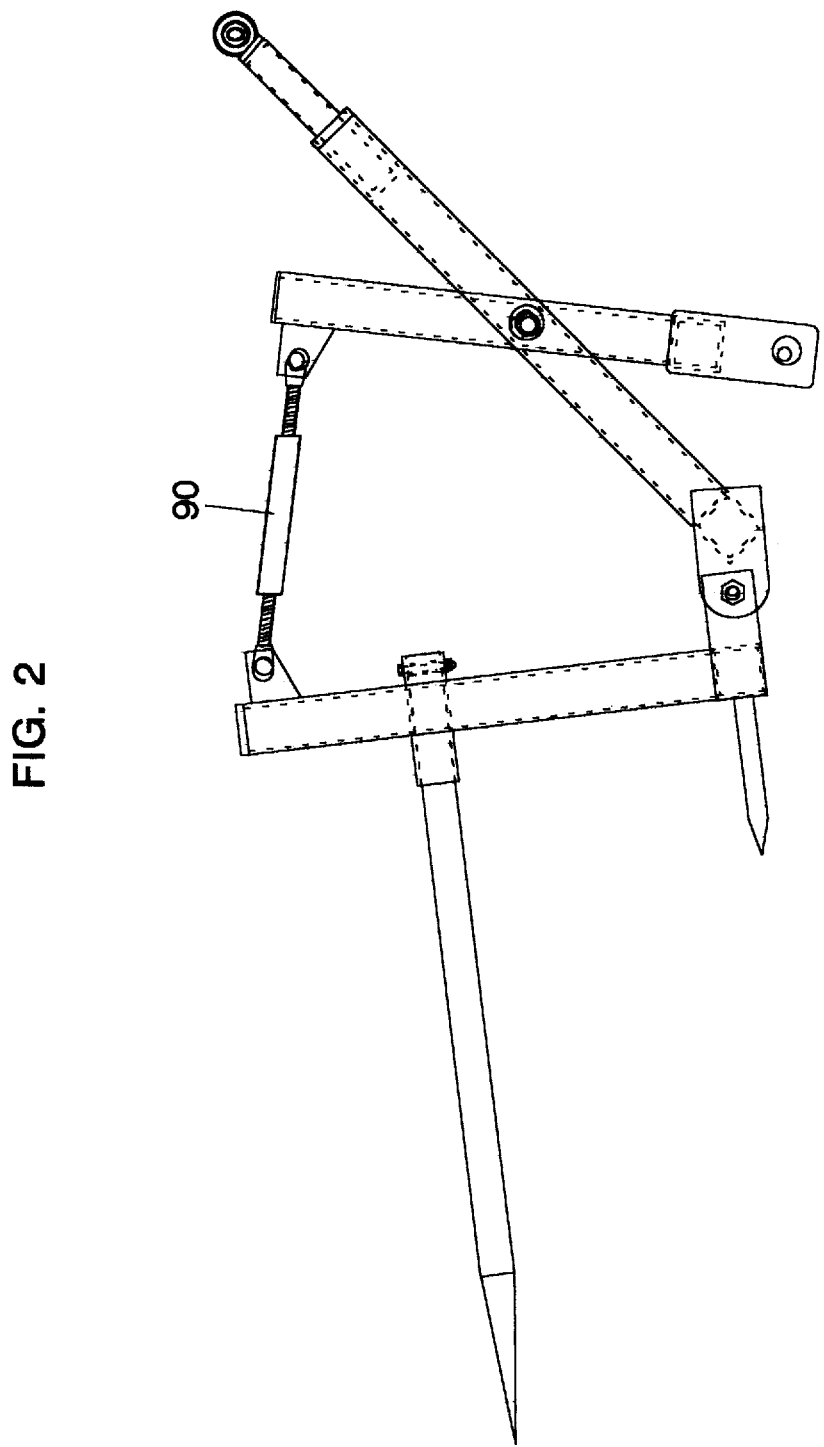
FIG. 2 shows the side view of the lift as assembled. The plane of this view illustrates the entire working range of this mechanism, since the action is entirely vertical.

Referring to FIGS. 1 and 2, the Heavy-duty Hay Scissors Lift is made up of 4 members, a Stage 1, a Stage 2, a Stage 3, and an intermediate member 90. Stages 1 and 2 are interconnected and pivot upon each other in a Scissors-like manner, raising Stage 3 to its highest point when the lower lift arms of the tractor are raised to their topmost point. Stage 1 is fixed so as to connect to the lower lift arms of the farm tractor, and to interconnect with Stage 2. Stage 2 likewise interconnects with Stage 1, and is fixed so as to connect to the upper point of the three-point hitch, also called the top link. Stage 3 connects at it lowest point to the lowest point of Stage 2, and at its upper point to the intermediate member, which is then connected to the upper point of Stage 1 at its opposite end.

The Elements

Figure 3:
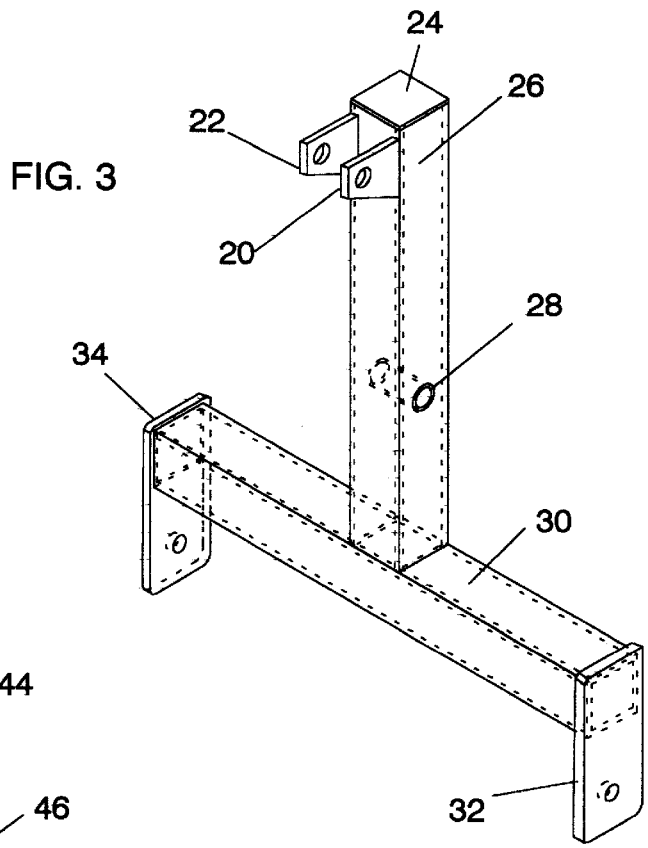
FIG. 3 illustrates Stage 1 of the Heavy-duty Hay Scissors Lift assembly.

Referring to FIG. 3, Stage 1 is constructed of a riser 26 joined at a right angle to and at the midpoint of a crossbar 30, which has a pair of extension plates 32 and 34 mounted on each end face. These extension plates 32 and 34 reach past the end of the crossbar 30, and each has a through hole fitted for a conventional lift pin. This lift pin (not shown) forms the means of pivotable connection to the lift arms of the tractor. At the optimum vertical distance from the joint of the crossbar 30 and the riser 26, the riser 26 is penetrated by a bushing 28 which is permanently fixed in place and which provides a hinge point for the scissors-action of the Heavy-duty Hay Scissors Lift. At the top of the riser 26 there is attached a top 24 which seals the end of the material. At this same end of the riser 26 there is a pair of spaced parallel connecting ears 20 and 22 each with a through hole which forms a means of pivotable connection to an adjustable length intermediate member 90.

Referring to FIG. 4, a Stage 2 is constructed of a pair of spaced parallel beams 46 and 58 which are joined to a spreader 50, the beams 46 and 58 being equally spaced from the midpoint of the spreader 50 and also spaced apart at a distance sufficient to clear the width of the riser 26 of Stage 1. The topmost ends of the parallel beams 46 and 58 are joined by a cap 44, and are connected a second time at a slightly lower point by a plate 60 which forms the base for a bar 42 which passes through the cap 44 and extends upward. The topmost point of the bar 42 contains a through hole fitted for pivotable connection to the top link of the tractor's three-point hitch. The preferred construction utilizes a rod end 40 attached to the topmost point of the bar 42, which forms the connecting point for pivotable connection to the top link of the tractor's three-point hitch. The conventional rod end provides more stability and less wear of the connection.

At an optimum vertical distance from the joint of the spreader 50 with the beams 46 and 58, the beams 46 and 58 are each penetrated by a bushing 48 and 56 respectively which are permanently fixed in place and which form the mating pieces of the hinge point for the scissors-action of the Heavy-duty Hay Scissors Lift. A pair of shoes 52 and 54 which are mounted at a diagonal and extend down and outward are attached at opposite ends of the spreader 50, each having a through hole sized for pivotable connection to Stage 3.

Figure 5:
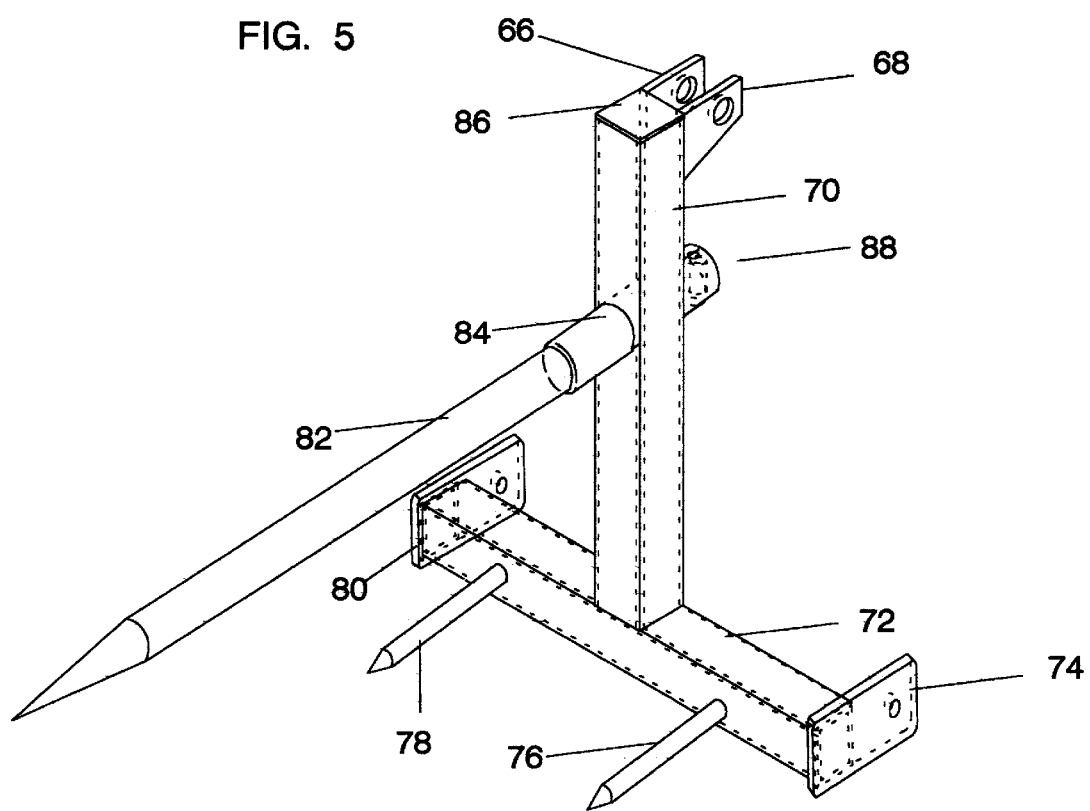
FIG. 5 illustrates Stage 3 of the Heavy-duty Hay Scissors Lift assembly.
Figure 6:
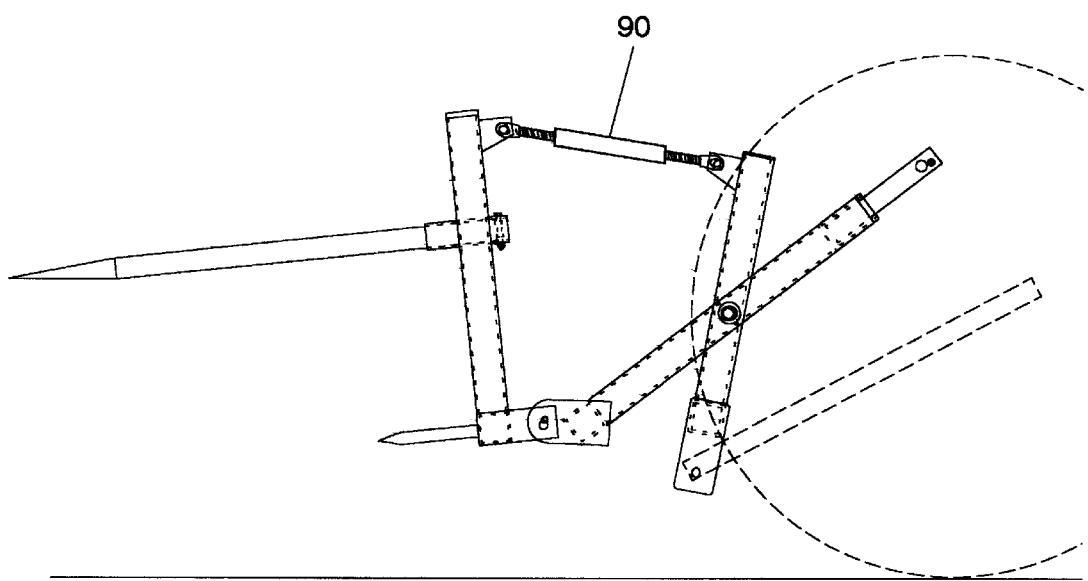
FIG. 6 illustrates the collapsed Heavy-duty Hay Scissors Lift in its initial position as installed on the tractor's three-point hitch.

Referring to FIG. 5, a Stage 3 is assembled with an upright 70 attached at the midpoint of a base 72. There is an end cap 86 at the top of the upright 70. A pair of extensions 74 and 80, which are mounted at a right angle and extend rearward, are attached to the opposite open ends of the base 72. These extensions reach toward the shoes 52 and 54 of Stage 2, and contain a through hole for pivotable connection to Stage 2.

The top of the upright 70 is fitted with a pair of spaced parallel hands 66 and 68 which are each fitted with a through hole for pivotable connection to an adjustable length intermediate member 90. A length of pipe 84 is mounted horizontally through and perpendicular to the upright 70. This pipe 84 has a through hole above and below for means of fixed attachment of a spear 82 which has permanently affixed to its flat end a bushing 88. A conventional bolt (not shown) is inserted through the pipe 84, into the bushing 88, back out of the pipe 84, and is fastened with conventional hardware. A centered pair of stabilizer spears 76 and 78 are attached to the base 72 at two specified locations.

An adjustable length intermediate member 90, shown in FIG. 2, is inserted between the spaced parallel ears 20 and 22 of Stage 1 at one end, and between the spaced parallel hands 66 and 68 of Stage 3 at the opposite end, being secured with conventional keeping means. The length of the intermediate member 90 is adjusted so that when the Heavy-duty Hay Scissors Lift is installed in its original position on the three-point hitch of the tractor, with the tractor's lift arms fully lowered, the spear 82 of Stage 3 is pointing just slightly down from the horizontal.

When the lift arms of the tractor are actuated to raise, the attached Stage 1 will raise vertically, while tilting toward the tractor, due to the constraint of Stage 2 and its fixed hinge point at the top link. Stage 2 will rotate with the bottom end raising and moving away from the tractor in an arc, pushing Stage 3 vertically upward while tilting the top of Stage 3 slightly toward the tractor where Stage 3 is connected to the Intermediate Member, the opposite end of which is connected to the top of Stage 1.

A modified form of the invention is illustrated FIG. 8. In this alternate embodiment the adjustable length intermediate member 90 is replaced by a hydraulic cylinder 92, which when actuated, will tilt the spear 82 of Stage 3 forward, thus allowing the weight of the bale to release from the load engaging means of Stage 3. The advantage of this embodiment is to provide a means of depositing a bale into a conventional feeding ring, or hay ring, which includes a circular framework, usually constructed of tubular steel, containing enough cross pieces to keep livestock from walking onto the bale while allowing access for livestock to reach through and eat from the bale, without the added inconvenience of dismounting the tractor to relocate the hay ring around the newly deposited hay bale.

Installation and Operation

Installation is simple and quick. To mount the Heavy-duty Hay Scissors Lift onto the tractor, position the Heavy-duty Hay Scissors Lift as shown in FIGS. 1 and 2. Back the tractor, with its lift arms at their lowest position, toward the Heavy-duty Hay Scissors Lift until the tractor's lift arms lightly touch the conventional lift pins (not shown) which are mounted on the extension plates 32 and 34 of Stage 1. Insert the pins into the links of the lift arms, and fasten with conventional keepers (not shown). Manually push the rod end 40 at the top of Stage 2 into the opening of the top link on the tractor's three-point-hitch. Insert a conventional pin through the first half of the top link, then the rod end 40, then the second half of the top link, securing with a conventional keeper. Attach the conventional adjustable length intermediate member 90 between the connecting ears 20 and 22 of Stage 1 at one end, and between the spaced parallel hands 66 and 68 of Stage 3 at the opposite end, securing both ends with conventional pins and keepers. Adjust the length of the adjustable length intermediate member 90 so that the spear 82 points just slightly below the horizontal when the lift arms of the tractor are at their fully lowered position. The Heavy-duty Hay Scissors Lift is now ready to pick up a bale of hay.

The operation is simple, quick, and provides the operator maneuverability as well as multiple options for placement.

The hay bales can be stacked, loaded on a trailer, or delivered to the pasture for feeding.

To operate:

approach the flat side of the hay bale by backing the tractor toward the bale. The spear 82 should touch the bale six (6) to twelve (12) inches below the center of the bale. Allow the tractor to ride rearward into the bale in one smooth motion, piercing the bale the entire length of the spear 82. Actuate the tractor's lift arms and the bale will rise in an arc above and behind the operator of the tractor. Continue to keep the bale raised and at a slow to moderate speed, drive the tractor to the desired location. Position the bale above the desired set-down point, lower the lift arms until the bale is on the ground or trailer, and simply drive away. The weight of the bale will keep it in place as the spear 82 is removed from the bale.

Other alternative and equally useful and/or equivalent configurations, assembly methods, and mounting arrangements could be applied to accomplish the intent and purpose of the Heavy-duty Hay Scissors Lift. It is to be understood that while the present invention has been shown and described with reference to the preferred methods, materials, and construction methods, comprising the complete overall mechanism, the invention is not limited to the precise forms set forth, and that various modifications and changes may be made without departing from the spirit and scope of the present invention, a Heavy-duty Hay Scissors Lift. There is no intention that the invention should be limited by any of the details of the description unless otherwise specified.

What is claimed is:

1. A Heavy-duty Hay Scissors Lift to be utilized as an attachment for a three-point hitch of a farm tractor having a pair of horizontally spaced lower lift arms and an upper attachment point spaced vertically above the lift arms and horizontally midway between them, said Heavy-duty Scissors Lift comprising:

a Stage 1 having a lower end, a middle, and a top end wherein said lower end is adapted for pivotable connection to the lift arms of a tractor;

a Stage 2 having a lower end, a middle, and an upper end which is adapted for pivotable connection to the top link of a tractor, wherein said middle of said stage 2 is pivotably attached to said middle of said Stage 1;

a Stage 3 having a lower end, a middle, and a top end, said lower end being pivotably attached to said lower end of said Stage 2, said Stage 3 having means for engaging a load;

an Intermediate Member having a first end and a second end, said first end of said Intermediate Member being pivotably attached to said top end of said Stage 1 and said second end of said Intermediate Member being pivotably attached to said top end of said Stage 3, thus comprising a linkage wherein said Stage 1, said Stage 2, said Stage 3, and said Intermediate Member are pivotably coupled to one another in a successive assembly, which allows the working, farthest reaching end point to be free-ranging, and which, when actuated by movement of the horizontally spaced lower lift arms of the tractor, produces a multiplied vertical movement at said load engaging means of said Stage 3 sufficient to set one bale directly upon another bale, and wherein said load engaging means easily releases the load in the desired location by means of the weight of the load resting on the new location.

2. A Heavy-duty Hay Scissors Lift as defined in claim 1, wherein Stage 1 comprises a crossbar having a first end, a middle and a second end, a first extension plate rigidly attached to said first end of said crossbar, a second extension plate rigidly attached to said second end of said crossbar, a riser having a bottom end which is rigidly attached to said middle of said crossbar, a middle and a top end which is adapted for pivotable connection, and wherein said first and second extension plates are adapted for connection to the lift arms of a tractor;

and wherein Stage 2 comprises a spreader having a first end, a middle and a second end, a first shoe rigidly attached to said first end of said spreader and a second shoe rigidly attached to said second end of said spreader, a pair of spaced parallel beams having a lower end which is rigidly attached to the middle of said spreader, a middle and an upper end which is adapted for pivotable connection to the top link of a tractor, wherein said middle of said spaced parallel beams is pivotably attached to said middle of said riser of Stage 1;

and wherein Stage 3 comprises a base having a first end, a middle and a second end, a first extension rigidly attached to said first end of said base, a second extension rigidly attached to said second end of said base, an upright having a bottom end which is rigidly attached to the middle of said base, a middle and a top end which is adapted for pivotable connection, said upright having means for engaging a load, and said base having means for stabilizing said load, and wherein said first and second extensions are pivotably attached to said first and second shoes of said Stage 2 respectively; and wherein said first end of said Intermediate Member being pivotably attached to said top end of said riser of said Stage 1 and said second end of said Intermediate Member being pivotably connected to said top end of said upright of said Stage 3, thus comprising a linkage wherein said Stage 1 and said Stage 2 hinge scissors-fashion one upon the other, when actuated by movement of the horizontally spaced lower lift arms of the tractor, or other power source, producing a multiplied movement at the load engaging stage sufficient to set one bale directly upon another bale, and wherein said load engaging means easily releases the load in the desired location by means of the weight of the load resting on the new location.

3. A Heavy-duty Hay Scissors Lift as defined in claim 1 wherein said means for engaging a load of said Stage 3 consists of an arrangement of cylindrical rods such that the elongated central conical-tipped member impales a bale while the lower, shorter cylindrical elements provide for stabilizing the load, said elongated central conical-tipped rod being supported in a length of pipe, acting as a sheath for support and rigid attachment of said rod, as a means for lifting large bales, preferably round bales of hay averaging in weight from 1,000 to 2,000 pounds, but which may be used for other weights and configurations of material.

4. A Heavy-duty Hay Scissors Lift as defined in claim 1 wherein said Intermediate Member comprises means for variably adjusting the length of said Intermediate Member.

5. A Heavy-duty Hay Scissors Lift as defined in claim 2 wherein said extensions, said extension plates, said shoes, which are fitted for means of pivotable connection, said riser, said crossbar, and of said pair of parallel beams, are sized and positioned to optimize the reach of the Heavy-duty Hay Scissors Lift to obtain a lift height sufficient to stack one six-foot round bale of hay upon another.

6. A Heavy-duty Hay Scissors Lift to be utilized as an attachment for a three-point hitch of a farm tractor having a pair of horizontally spaced lower lift arms and an upper attachment point spaced vertically above the lift arms and horizontally midway between them, said Heavy-duty Hay Scissors Lift comprising:

a Stage 1 having a crossbar having a first end, a middle and a second end, first extension plate rigidly attached to said first end of said crossbar, second extension plate rigidly attached to said second end of said crossbar, a riser having a bottom end which is rigidly attached to said middle of said crossbar, a middle and a top end which is adapted for pivotable connection, and wherein said first and second extension plates are adapted for connection to the lift arms of a tractor;

a Stage 2 having a spreader having a first end, a middle and a second end, a first shoe rigidly attached to said first end of said spreader and a second shoe rigidly attached to said second end of said spreader, a pair of spaced parallel beams having a lower end which is rigidly attached to the middle of said spreader, a middle and an upper end which is adapted for pivotable connection to the top link of a tractor, wherein said middle of said spaced parallel beams is pivotably attached to said middle of said riser of Stage 1;

a Stage 3 having a base having a first end, a middle and a second end, a first extension rigidly attached to said first end of said base, a second extension rigidly attached to said second end of said base, an upright having a bottom end which is rigidly attached to the middle of said base, a middle and a top end which is adapted for pivotable connection, said upright having means for engaging a load, and said base having means for stabilizing said load, and wherein said first and second extensions are pivotably attached to said first and second shoes of said Stage 2 respectively; and a Hydraulic Cylinder having a first end and a second end said first end of said Hydraulic Cylinder being pivotably attached to said top end of said riser of said Stage 1 and said second end of said Hydraulic Cylinder being pivotably attached to said top end of said upright of said Stage 3, thus comprising a linkage wherein said Stage 1 and said Stage 2 hinge scissors-fashion one upon the other, when actuated by movement of the horizontally spaced lower lift arms of the tractor, producing a multiplied movement at the load engaging stage sufficient to set one bale directly upon another bale; and wherein upon actuation of said Hydraulic Cylinder, said load engaging means is tilted outward and downward while elevated above the desired deposit location allowing said load to release from said load engaging means and said stabilizing means by force of gravity in combination with the weight of the bale.

* * * * *